US011287957B2

(12) United States Patent
Nakamori et al.

(10) Patent No.: US 11,287,957 B2
(45) Date of Patent: Mar. 29, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Yuta Nakamori, Tokyo (JP); Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/128,363

(22) Filed: Dec. 21, 2020

(65) Prior Publication Data

US 2021/0405834 A1  Dec. 30, 2021

(30) Foreign Application Priority Data

Jun. 24, 2020 (JP) .............................. JP2020-108880

(51) Int. Cl.
*G06F 3/0484* (2013.01)
*G06F 21/62* (2013.01)
*G06T 11/00* (2006.01)
*G06F 3/04817* (2022.01)

(52) U.S. Cl.
CPC ........ *G06F 3/0484* (2013.01); *G06F 21/6209* (2013.01); *G06T 11/00* (2013.01); *G06F 3/04817* (2013.01)

(58) Field of Classification Search
CPC ..... G06F 21/6209; G06F 3/0484; G06T 11/00
See application file for complete search history.

(56) References Cited

U.S. PATENT DOCUMENTS

| | | | |
|---|---|---|---|
| 2009/0024661 A1* | 1/2009 | Kelliher | G06F 16/907 |
| 2012/0079426 A1* | 3/2012 | Jin | H04N 13/156 |
| | | | 715/810 |
| 2013/0194175 A1* | 8/2013 | Tarama | G06F 3/04842 |
| | | | 345/156 |
| 2015/0116314 A1* | 4/2015 | Saito | G09G 5/393 |
| | | | 345/419 |
| 2018/0229121 A1* | 8/2018 | Tokuchi | A63F 13/79 |
| 2019/0089930 A1* | 3/2019 | Hashimoto | G06F 3/017 |
| 2020/0296536 A1* | 9/2020 | Ashkenazi | G06T 19/006 |

FOREIGN PATENT DOCUMENTS

| | | |
|---|---|---|
| JP | 2000-181814 A | 6/2000 |
| JP | 2002-262337 A | 9/2002 |
| JP | 2009-508238 A | 2/2009 |

* cited by examiner

*Primary Examiner* — Andrea C Leggett

(74) *Attorney, Agent, or Firm* — Oliff PLC

(57) ABSTRACT

An information processing apparatus includes a processor configured to, when an electronic data item is created, attach positional information to the electronic data item and present the electronic data item, in a virtual space representing a real space, at a location indicated by the attached positional information.

19 Claims, 9 Drawing Sheets

FIG. 3
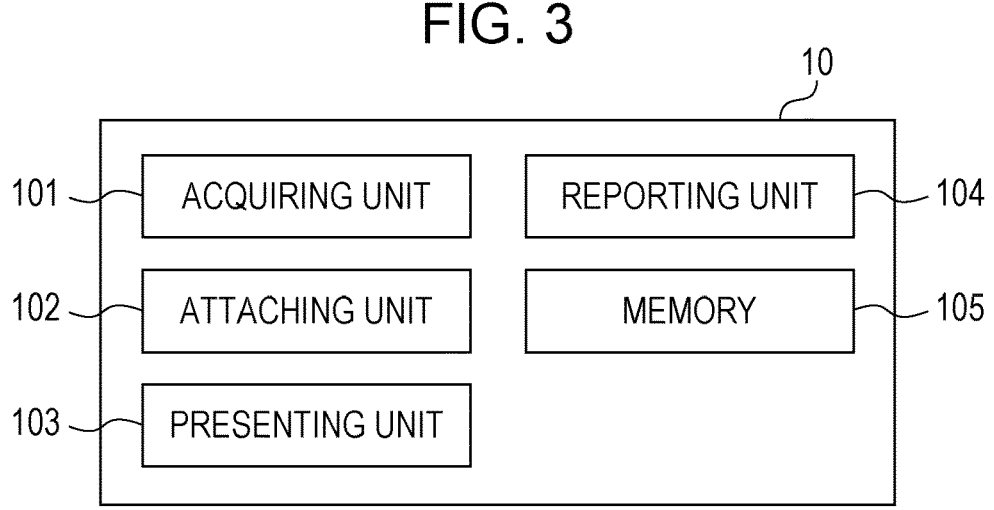
FIG. 4
| Data ID | User ID | Location |
|---|---|---|
| 0001 | User1 | the coffee shop on the third floor in the department store in front of Yokohama station |
| 0002 | User2 | the conference room on the fourth floor in the Tokyo-station building |
| 0003 | User2 | the meeting room in the Shinjuku office |
FIG. 5
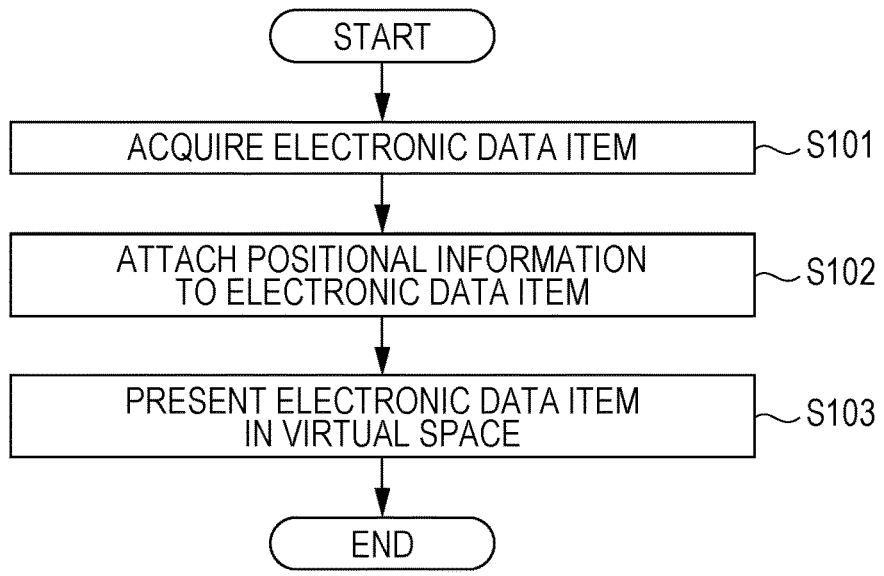

■ Forwarding

● Target
the record of a meeting held at
3 p.m. on February 10th, 2018
at the coffee shop on the third floor
in the department store in front of
Yokohama station ● Destination
the cafe in the office building in
Marunouchi, Tokyo FIG. 9
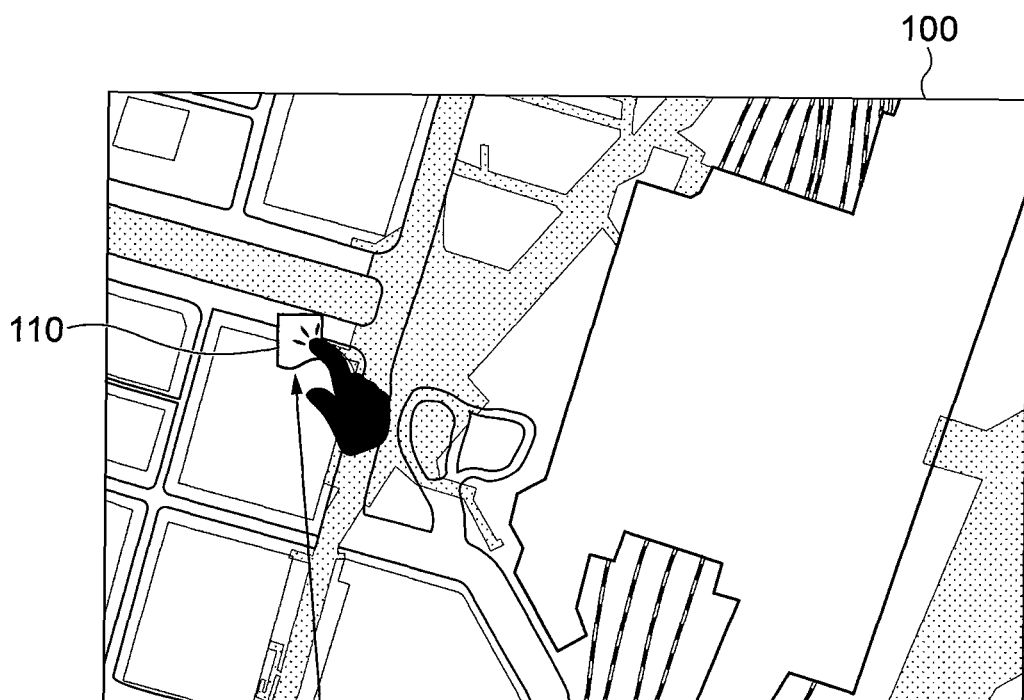

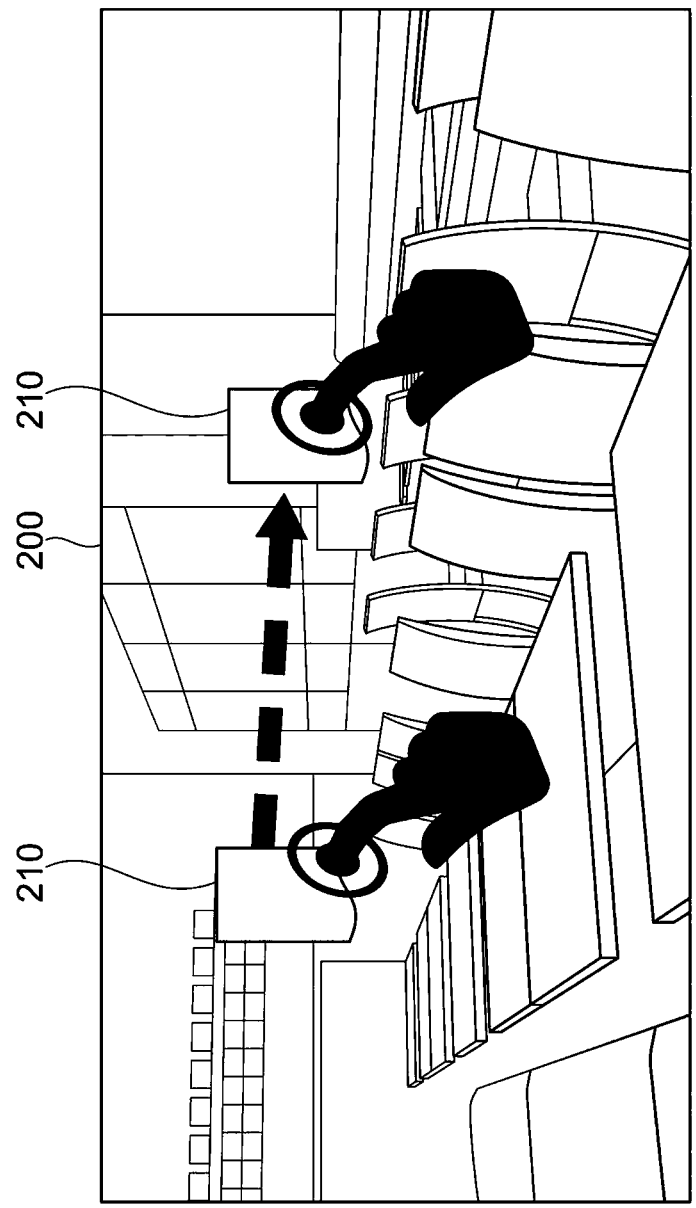

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-108880 filed Jun. 24, 2020.

BACKGROUND

(i) Technical Field

The present disclosure relates to an information processing apparatus and a non-transitory computer readable medium.

(ii) Related Art

Japanese Unexamined Patent Application Publication (Translation of PCT Application) No. 2009-508238 describes a disclosure aiming to provide an electronic document created, stored in, and/or transmitted from a geographical location, and the document is franked with identification of the geographical location of creation, storage, and/or transmission.

Japanese Unexamined Patent Application Publication No. 2000-181814 describes a disclosure aiming to provide an email system that enables data regarding the location of a transmission source (for example, a mailing address) to be also automatically included in a document when an email is sent.

Japanese Unexamined Patent Application Publication No. 2002-262337 describes a disclosure aiming to provide a portable wireless device that can determine the current position at a time point specified based on a user operation and that can easily attach the current position to the body or the header of an email.

SUMMARY

Although there are numerous existing techniques to associate an electronic document with positional information as described in the Related Art, no existing technique manages an electronic document associated with positional information by identifying in virtual space the location corresponding to a real-life location.

Aspects of non-limiting embodiments of the present disclosure relate to providing an information processing apparatus and a non-transitory computer readable medium storing a computer program that can manage an electronic data item associated with positional information by identifying in virtual space the location corresponding to a real-life location.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to, when an electronic data item is created, attach positional information to the electronic data item and present the electronic data item, in a virtual space representing a real space, at a location indicated by the attached positional information.

BRIEF DESCRIPTION OF THE DRAWINGS

An exemplary embodiment of the present disclosure will be described in detail based on the following figures, wherein:

FIG. 3 is a block diagram depicting an example of a functional configuration of the server;

FIG. 4 is an illustration depicting an example of information regarding electronic data items stored in a memory;

FIG. 5 is a flowchart depicting a flow of an electronic data management process performed by the server;

FIG. 7 is an illustration depicting an example of a user interface displayed by a mobile terminal;

FIG. 9 is an illustration depicting a specific example of an electronic data item presented in virtual space by the server;

FIG. 11 is an illustration depicting a specific example of an electronic data item presented in virtual space by the server.

DETAILED DESCRIPTION

Hereinafter, an exemplary embodiment according to the present disclosure will be described with reference to the drawings. In the figures, the same or equivalent elements and parts are denoted by the same reference signs. The dimensions and proportions in the figures are emphasized for the sake of description and are not necessarily drawn to scale.

Figure 1:
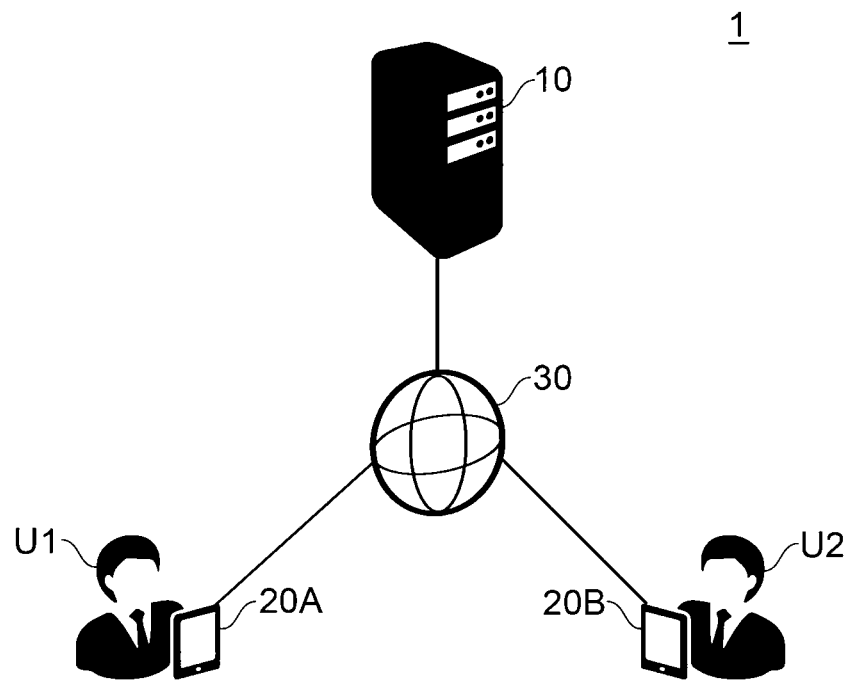
FIG. 1 is an illustration depicting a schematic configuration of an information processing system according to the present exemplary embodiment.

FIG. 1 is an illustration depicting a schematic configuration of an information processing system according to the present exemplary embodiment. In an information processing system 1 depicted in FIG. 1, a server 10 manages electronic data items, each of which has positional information attached. The positional information indicates a location within a virtual space representing a real space that exists in the real-world. The information processing system 1 depicted in FIG. 1 also presents an electronic data item managed by the server 10 to mobile terminals 20A and 20B used by users U1 and U2, respectively. The server 10 is an example of an information processing apparatus according to the present disclosure. The mobile terminals 20A and 20B each generally represent a portable terminal, such as a personal computer, a smartphone, or a tablet-type terminal.

An electronic data item generally represents an electronically created data item, and examples of the electronic data item include a data item created by using document-creation software, spreadsheet software, or presentation-creation software and a computer program created by using program-creation software. Examples of the electronic data item also include a three-dimensional (3D) data item with which to output a target product from a 3D printer. If document data is placed at a location in virtual space, a user can view the document data by going to the location in virtual space. In addition, if a computer program is placed at a location in virtual space, a self-driving robot, for example, moves to the location and obtains the computer program. Thus, the robot can obtain an additional function or update the version of the program that is running. Further, if a 3D data item is placed at a location in virtual space, a user can acquire from virtual space a target product associated with the location in virtual space and cause a 3D printer to output the target product in accordance with the 3D data item.

The server 10 and the mobile terminals 20A and 20B are communicatively connected via a network 30. The network 30 may be a wireless network or a wireline network. In FIG. 1, a single server is depicted as the server 10, and the two mobile terminals 20A and 20B are depicted. But the numbers of servers and mobile terminals are not limited to this example in the present disclosure. In the following description, the mobile terminals 20A and 20B are also collectively referred to simply as a mobile terminal 20.

The mobile terminal 20 transmits to the server 10 not only an electronic data item but also positional information to be attached to the electronic data item. The server 10 attaches to a specified electronic data item the positional information that is transmitted from the mobile terminal 20. Then, the server 10 presents to the mobile terminal 20 the electronic data item to which the positional information is attached as if the electronic data item were present in the virtual space.

Next, an example of a configuration of the server 10 will be described.

Figure 2:
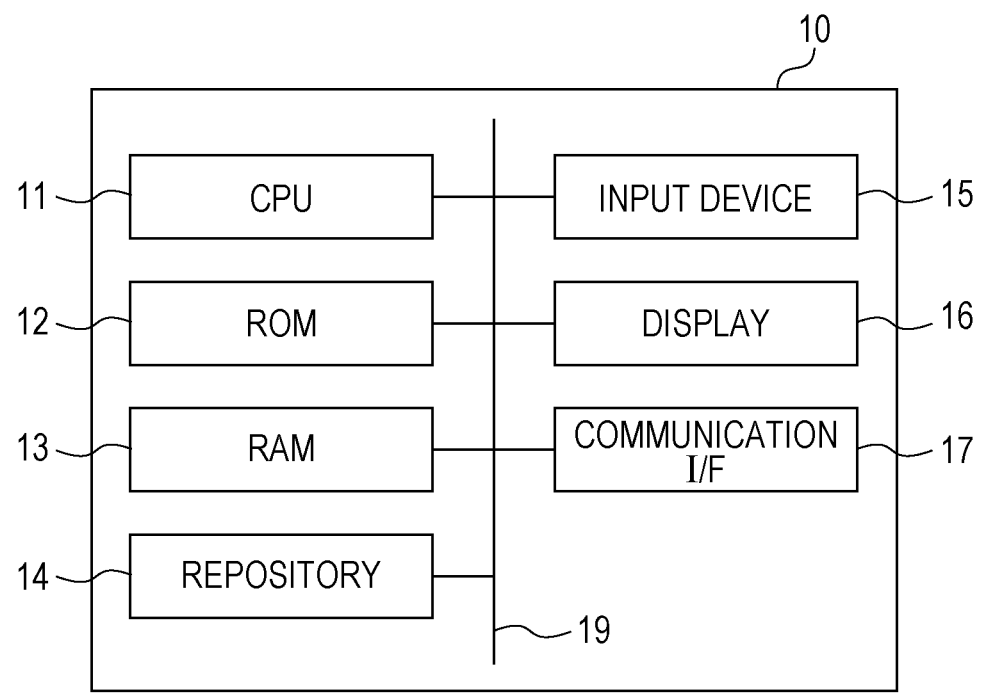
FIG. 2 is a block diagram depicting a hardware configuration of a server.

FIG. 2 is a block diagram depicting a hardware configuration of the server 10.

As depicted in FIG. 2, the server 10 includes a central processing unit (CPU) 11, a read-only memory (ROM) 12, a random-access memory (RAM) 13, a repository 14, an input device 15, a display 16, and a communication interface (I/F) 17. These units are communicatively connected to each other by using a bus 19.

The CPU 11, which is a central computing processing unit, executes various programs and controls each unit. Specifically, the CPU 11 loads programs from the ROM 12 or from the repository 14 and uses the RAM 13 as a working space to execute the programs. The CPU 11 controls each unit described above and performs various kinds of computing processing in accordance with the programs recorded on the ROM 12 or on the repository 14. In the present exemplary embodiment, the ROM 12 or the repository 14 stores an electronic data management program that manages electronic data items by attaching positional information to the electronic data items and that presents the managed electronic data items to the mobile terminal 20.

The ROM 12 stores various programs and various kinds of data. The RAM 13 operates as the working space and temporarily stores programs or data. A storage device such as a hard disk drive (HDD), a solid state drive (SSD), or a flash memory constitutes the repository 14, which stores various programs including the operating system and various kinds of data.

The input device 15 includes a pointing device, such as a mouse, and a keyboard and is used for receiving various kinds of input.

The display 16 is, for example, a liquid crystal display and displays various kinds of information. The display 16 may adopt a touch panel system and may also function as the input device 15.

The communication interface 17 is an interface for communicating with other apparatuses, such as the mobile terminal 20, and such a standard as the Ethernet (registered trademark), fiber distributed data interface (FDDI), or Wi-Fi (registered trademark) is used.

While executing the management program above, the server 10 uses the hardware resource described above and realizes various functions. A functional configuration realized by the server 10 will be described.

FIG. 3 is a block diagram depicting an example of the functional configuration of the server 10.

As depicted in FIG. 3, the server 10 includes an acquiring unit 101, an attaching unit 102, a presenting unit 103, a reporting unit 104, and a memory 105 as functional sections. Each functional section is realized by the CPU 11, which loads and executes the electronic data management program stored in the ROM 12 or in the repository 14.

The acquiring unit 101 acquires an electronic data item from the mobile terminal 20. The electronic data item acquired by the acquiring unit 101 is a target data item to which positional information is to be attached by the attaching unit 102. The acquiring unit 101 also acquires from the mobile terminal 20 positional information to be attached to an electronic data item.

In addition, the acquiring unit 101 acquires from the mobile terminal 20 specifics of operation on an electronic data item. The specifics of operation on an electronic data item include, for example, an operation of selecting an electronic data item, an operation of displaying information regarding an electronic data item, an operation of changing the positional information attached to an electronic data item, and an operation of deleting an electronic data item from virtual space.

The attaching unit 102 attaches positional information to an electronic data item acquired by the acquiring unit 101. Virtual space may be, for example, a map representing a real space or a visual image of the real space captured using a camera. After attaching the positional information to the electronic data item, the attaching unit 102 stores in the memory 105 the electronic data item to which the positional information space is attached.

In some cases, the acquiring unit 101 may acquire positional information attached to the electronic data item, the positional information indicating a location where the user was present when the electronic data item was created. If the positional information is attached to the electronic data item, the attaching unit 102 stores the electronic data item and the attached positional information in the memory 105.

The presenting unit 103 presents to the mobile terminal 20 an electronic data item, which is stored in the memory 105 and to which positional information is attached, as if the electronic data item were present in a virtual space representing the real space. Examples of presentation of an electronic data item will be described below in detail.

After the acquiring unit 101 acquires from the mobile terminal 20 positional information to be attached to an electronic data item, in accordance with the circumstance, the reporting unit 104 sends, to a user who manages the location specified by the positional information, a report on the attachment of the positional information. In addition, after the acquiring unit 101 acquires from the mobile terminal 20 positional information to be attached to an electronic data item, in accordance with the circumstance, the reporting unit 104 reports contact information of an administrator who manages the location specified by the positional information to the mobile terminal 20 of a user who tries to attach the positional information to the electronic data item.

The memory 105 stores various kinds of information. For example, the memory 105 stores the electronic data item, which has been acquired from the mobile terminal 20 and to which the positional information has been attached by the attaching unit 102.

FIG. 4 is an illustration depicting an example of information regarding electronic data items stored in the memory 105. The data identification (ID) column in FIG. 4 stores data ID with which to uniquely identify an electronic data item. The user ID column stores user ID with which to uniquely identify a user who has processed the electronic data item. The location column stores positional information attached to the electronic data item. If no positional information is attached to the electronic data item, no information is stored at a place that corresponds to the electronic data item in the location column. Thus, the location column is allowed to store no information.

Next, an operation of the server 10 will be described.

FIG. 5 is a flowchart depicting a flow of an electronic data management process performed by the server 10. The CPU 11 reads the electronic data management program stored in the ROM 12 or in the repository 14 and loads the electronic data management program onto the RAM 13 to execute the program, and then the electronic data management process is performed.

First, the CPU 11 acquires an electronic data item from the mobile terminal 20 (step S101). After acquiring the electronic data item from the mobile terminal 20 in step S101, the CPU 11 subsequently attaches positional information to the acquired electronic data item (step S102). The positional information may be acquired from the mobile terminal 20 or attached to the electronic data item in advance when the electronic data item is created.

Following step S102, the CPU 11 presents the electronic data item in virtual space (step S103). The CPU 11 may present the electronic data item in virtual space by indicating the location of the electronic data item on a map or by superimposing the electronic data item onto a visual image of a real space captured by a camera.

The server 10 can assign to an electronic data item, to which positional information is attached, a location in digital space that corresponds to a real-life location and can manage the electronic data item by performing a series of operations described above. The server 10 can also present in virtual space the electronic data item managed by the server 10 by performing a series of operations described above.

Figure 6:
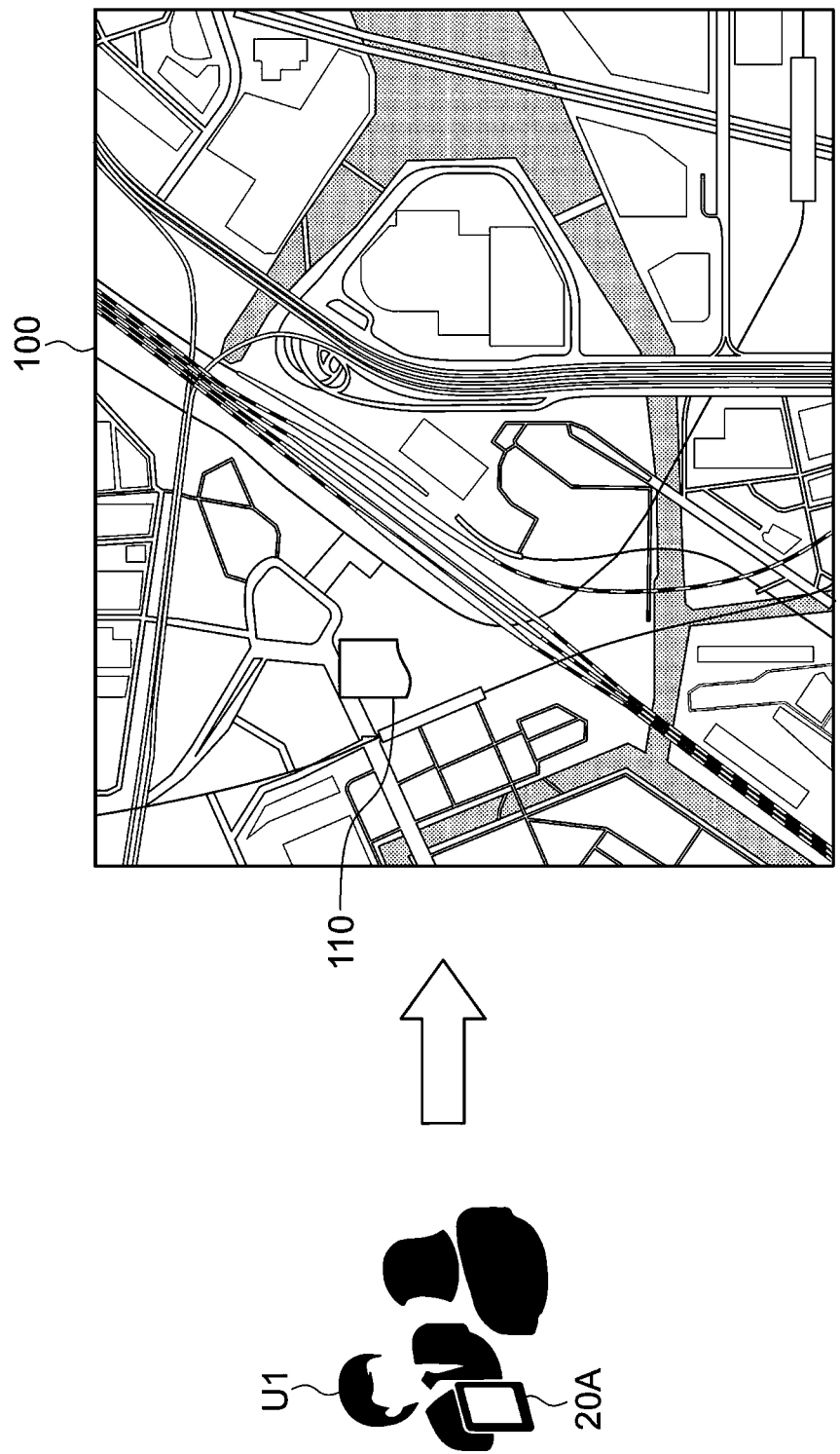
FIG. 6 is an illustration depicting a specific example of an electronic data item presented in virtual space by the server.

A description will be given of a specific example of an electronic data item presented in virtual space by the server 10. FIG. 6 is an illustration depicting the specific example of an electronic data item presented in virtual space by the server 10. Such presentation of an electronic data item in virtual space as is depicted in FIG. 6 is performed, for example, by using the mobile terminal 20A.

For example, a description will be given of a case where a user, who is assumed to be the user U1, has a meeting in a coffee shop on the third floor in a department store in front of Yokohama station and creates a meeting record by using the mobile terminal 20A. The mobile terminal 20A transmits the created meeting record to the server 10. The server 10 attaches to the data of the meeting record the positional information of the coffee shop on the third floor in the department store in front of Yokohama station and manages the data of the meeting record.

Then, the server 10 displays an icon 110 of the meeting record on a map 100 as depicted in FIG. 6 and thus presents the electronic data item of the meeting record in virtual space. The map 100 is an example of virtual space displayed on a screen of the mobile terminal 20. In this way, the server 10 displays the icon 110 on the map 100 and thus can indicate to a user in an easily understandable manner the location in virtual space, which is assigned to the electronic data item.

In response to a predetermined operation performed by the user on the icon 110 to select the electronic data item, the server 10 may cause the mobile terminal 20 to present the content of the electronic data item corresponding to the icon 110. Examples of the predetermined operation include an operation of consecutively tapping the icon 110 (a double tap operation). If the electronic data item corresponding to the icon 110 is document data, the server 10 causes the mobile terminal 20 to present the content of the document data.

In response to a predetermined operation performed by the user on the icon 110, the server 10 may cause the mobile terminal 20 to present in the vicinity of the icon 110 the information regarding the electronic data item corresponding to the icon 110. Examples of the predetermined operation include an operation of tapping the icon 110 and a press-and-hold operation on the icon 110 and are different from the operation for selection. In this case, the server 10 may cause the mobile terminal 20 to present as the information regarding the electronic data item such information as the name, the type, and the creation date of the electronic data item and the user who has created the electronic data item.

If positional information is allowed to be attached to an electronic data item without limitation, positional information of a location unrelated to the electronic data item may be attached. This may cause inconvenience to a resident or a user of the location, who has no relation to the electronic data item. Thus, before attaching positional information of a location to an electronic data item, the server 10 may determine whether a user who tries to attach the positional information to the electronic data item is authorized to attach the positional information of the location. In other words, there may be a location whose positional information is allowed to be attached to an electronic data item only by authorized users. For example, in accordance with whether the level of a user is equal to or higher than the level set for a location whose positional information is to be attached to an electronic data item, the server 10 may determine that the user is authorized to attach the positional information to the electronic data item.

If permission of the administrator who manages a location is required to attach positional information of the location to an electronic data item, the server 10 may report contact information of the administrator to a user who tries to attach the positional information of the location. Then, the server 10 may require the permission granted by the administrator of the location as a condition of attaching the positional information to the electronic data item.

If permission of the administrator who manages a location is required to attach positional information of the location to an electronic data item, the server 10 may report to the administrator that attaching the positional information to the electronic data item has been requested. Then, the server 10 may require the permission granted by the administrator of the location as a condition of attaching the positional information to the electronic data item.

The server 10 may also permit a user to attach positional information to an electronic data item on condition that the user, who tries to attach the positional information, has paid a charged fee. In addition, the server 10 may authorize a user to attach positional information to an electronic data item and may permit the user to attach the positional information on condition that the user, who tries to attach the positional information, has viewed a predetermined advertisement.

The server 10 may determine whether the time at which to attach positional information of a location to an electronic data item is in a time period during which the positional information of the location is allowed to be attached. The server 10 may retain information regarding the time period during which the positional information of the location is allowed to be attached. Alternatively, the information regarding the time period may be present in other places.

The server 10 can receive from a user a change in positional information attached to an electronic data item. FIG. 7 is an illustration depicting an example of a user interface displayed by the mobile terminal 20A. FIG. 7 depicts the example of a user interface regarding directions for forwarding an electronic data item located at the coffee shop on the third floor in the department store in front of Yokohama station to the cafe in the office building in Marunouchi, Tokyo. The electronic data item concerns the record of a meeting held at 3 p.m. on Feb. 10, 2018.

In response to directions for forwarding the electronic data item of the meeting record to the cafe in the office building in Marunouchi, Tokyo, the directions being input by the user U1 into the user interface displayed by the mobile terminal 20A, the mobile terminal 20A requests the server 10 to forward the electronic data item of the meeting record to the cafe in the office building in Marunouchi, Tokyo.

In receiving from the mobile terminal 20A the request to forward the electronic data item of the meeting record, the server 10 changes the positional information attached to the electronic data item from the coffee shop on the third floor in the department store in front of Yokohama station to the cafe in the office building in Marunouchi, Tokyo. Then, in response to the request from the mobile terminal 20A, the server 10 presents in virtual space the electronic data item of the meeting record in accordance with the positional information that has been changed.

Figure 8:
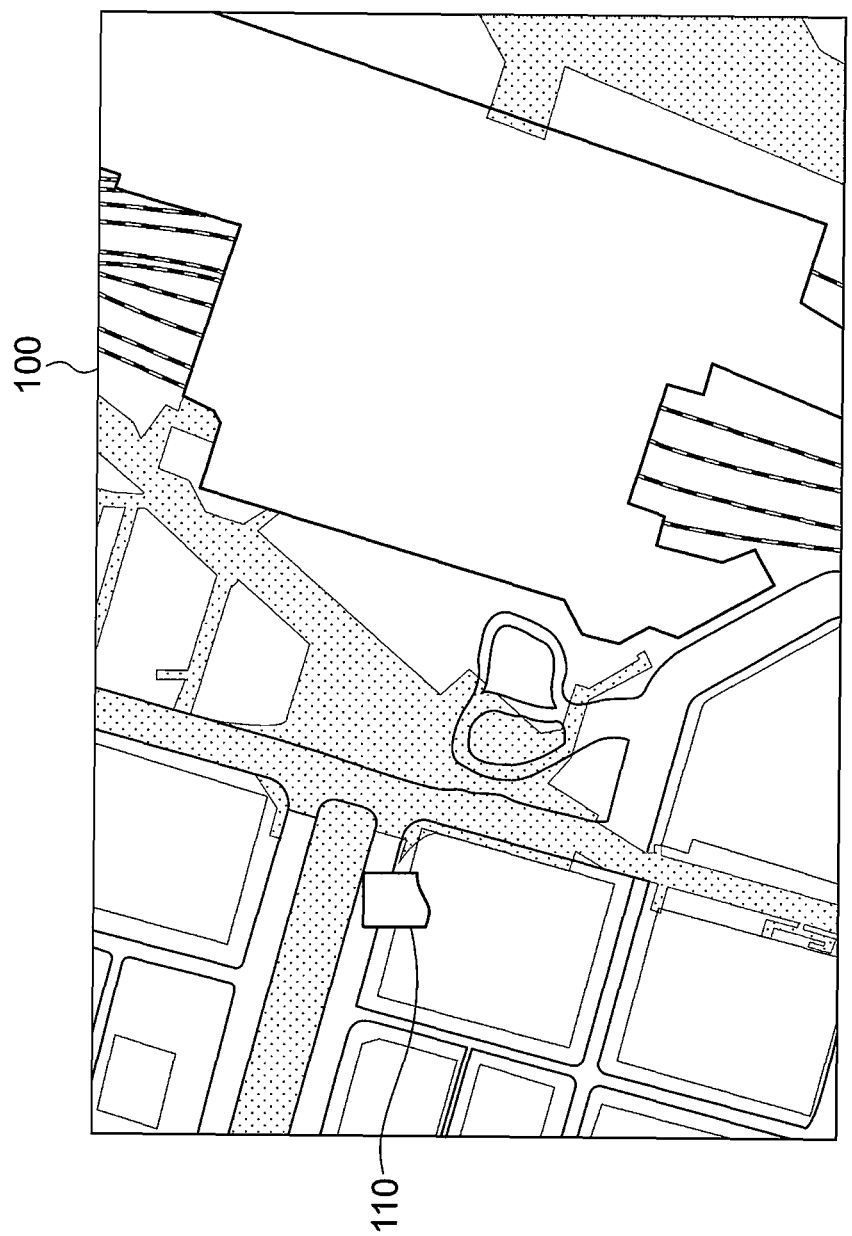
FIG. 8 is an illustration depicting a specific example of an electronic data item presented in virtual space by the server.

FIG. 8 is an illustration depicting a specific example of an electronic data item presented in virtual space by the server 10. Such presentation of the electronic data item in virtual space as is depicted in FIG. 8 is performed, for example, by using the mobile terminal 20A. In response to the request to forward the electronic data item of the meeting record to the cafe in the office building in Marunouchi, Tokyo, the request being sent by the mobile terminal 20A to the server 10, the server 10 displays the map 100 and the icon 110 as depicted in FIG. 8 and thus provides presentation as if the electronic data item of the meeting record were located in the cafe in the office building in Marunouchi, Tokyo.

The positional information attached to an electronic data item may be changed by a user in accordance with a user operation on the map 100 presented by the server 10. FIG. 9 is an illustration depicting a specific example of an electronic data item presented in virtual space by the server 10. Such presentation of the electronic data item in virtual space as is depicted in FIG. 9 is performed, for example, by using the mobile terminal 20A. The user uses a finger to drag the icon 110 displayed on the map 100 and moves the icon 110 from the department store in front of Yokohama station to the office building in Marunouchi, Tokyo. In accordance with the user operation, the server 10 performs a process to change the positional information attached to the electronic data item.

The electronic data item may be copied to another location instead of moving to another location. If the electronic data item is copied to another location, the server 10 may cause the memory 105 to store a new data item in accordance with the assignment of a new location. In other words, the server 10 may cause the memory 105 to store a data item that has single data ID and to which positional information of a plurality of locations is attached.

Figure 10A:
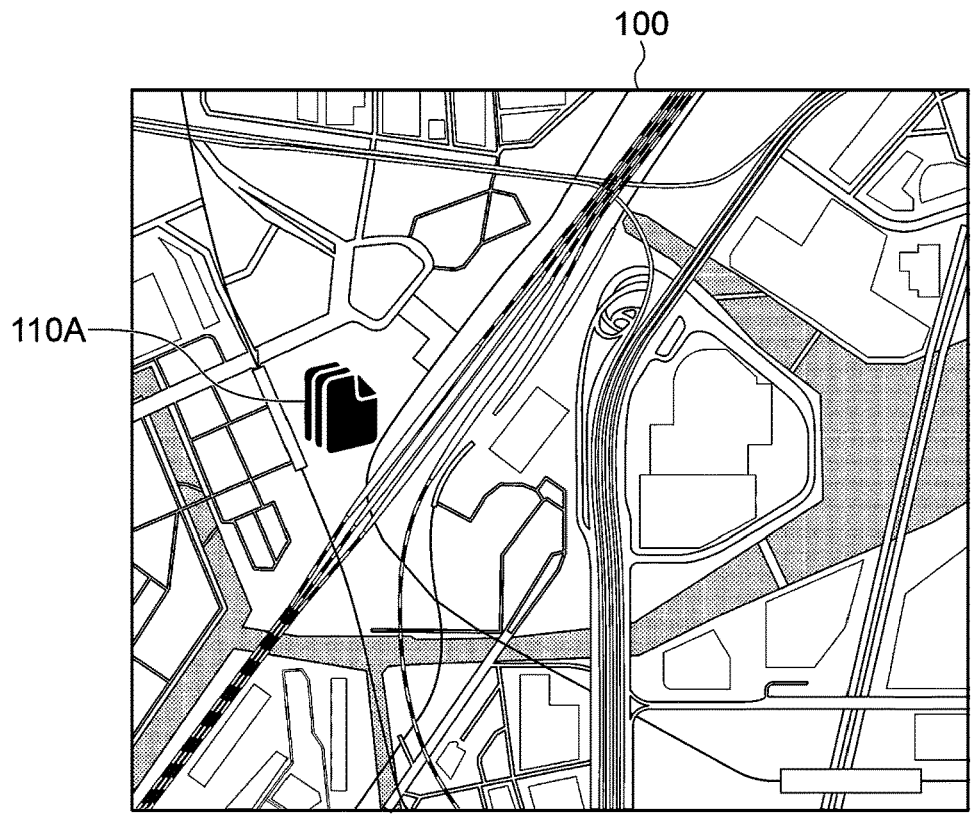
FIG. 10A is an illustration depicting a specific example of electronic data items presented in virtual space by the server.
Figure 10B:
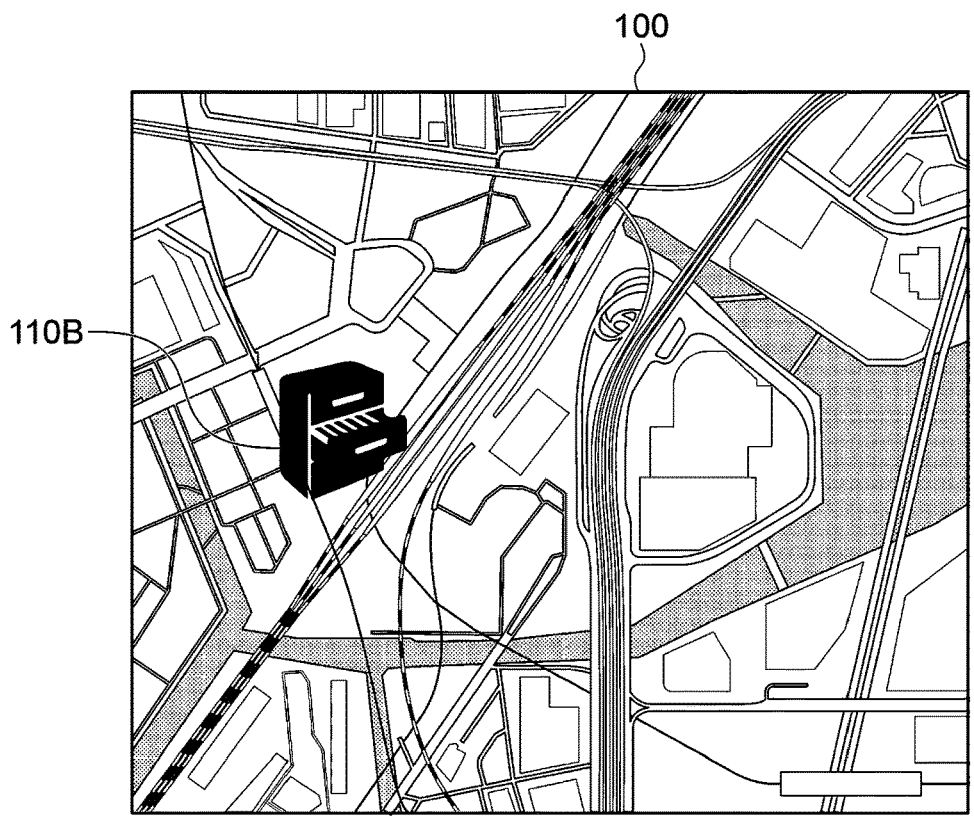
FIG. 10B is an illustration depicting a specific example of electronic data items presented in virtual space by the server.

FIGS. 10A and 10B are each an illustration depicting a specific example of electronic data items presented in virtual space by the server 10. Such presentation of the electronic data items in virtual space as is depicted in FIGS. 10A and 10B is performed, for example, by using the mobile terminal 20A. The server 10 presents an icon 110A in FIG. 10A when the number of electronic data items to which the same positional information is attached is less than a predetermined threshold. The server 10 presents an icon 110B in FIG. 10B when the number of electronic data items to which the same positional information is attached is equal to or more than the predetermined threshold. In this way, when presenting electronic data items in virtual space, the server 10 may change the presentation mode in accordance with the number of electronic data items to which the same positional information is attached.

If a user uses the mobile terminal 20 and takes a photograph at a location whose positional information has been attached to an electronic data item, the server 10 may present the electronic data item in a visual image captured in the photograph. FIG. 11 is an illustration depicting a specific example of an electronic data item presented in virtual space by the server 10. Such presentation of the electronic data item in virtual space as is depicted in FIG. 11 is performed, for example, by using the mobile terminal 20A. FIG. 11 depicts a visual image 200 obtained by taking a photograph in the coffee shop on the third floor in the department store in front of Yokohama station. The server 10 superimposes an icon 210 of the electronic data item having data ID 0001 onto the visual image 200 captured by the mobile terminal 20A and presents the visual image 200 onto which the icon 210 is superimposed. The positional information of the coffee shop on the third floor in the department store in front of Yokohama station is attached to the electronic data item having the data ID 0001.

A user operation may enable the icon 210 to move in the visual image 200. In response to a movement of the icon 210 caused by a dragging operation by the user, the server 10 changes the positional information attached to the electronic data item to the positional information of a location to which the icon 210 has been moved.

For each user, the server 10 may restrict access for viewing an electronic data item present in virtual space. In other words, only one or more authorized users may be allowed to view such an electronic data item present in virtual space.

The server 10 may change a presentation mode of an electronic data item present in virtual space as time passes after the creation of the electronic data item. For example, the server 10 may present an electronic data item present in virtual space gradually further backward as time passes after the creation of the electronic data item. Then, the server 10 may stop presenting the electronic data item in virtual space when a predetermined amount of time has passed after the creation of the electronic data item. The server 10 can explicitly indicate to the user the amount of time that has passed after the creation of the electronic data item by changing the presentation mode of the electronic data item present in virtual space as time passes after the creation of the electronic data item.

The server 10 may present a trash-can icon with which to remove electronic data items on a map or in a visual image. The map and the visual image are presented as virtual space. If a user moves the icon of an electronic data item to the trash-can icon, the server 10 removes the electronic data item.

If a user downloads the electronic data item onto the mobile terminal 20 or sends the electronic data item to a device other than the mobile terminal 20, the server 10 also removes the electronic data item. In other words, if an electronic data item is moved to a device in a real space, the server 10 may remove the electronic data item from the virtual space presented to the user.

The server 10 may present to the mobile terminal 20 a guide to a location whose positional information is attached to an electronic data item. The server 10 may present the guide to the location whose positional information is attached to the electronic data item by using an indicator such as a voice or an image of an arrow. The server 10 presents the guide to the location whose positional information is attached to the electronic data item and thus can guide a user to the location whose positional information is attached to the electronic data item even if the user is unfamiliar with the location.

The server 10 according to the present exemplary embodiment attaches to an electronic data item positional information in this way and presents the electronic data item at a location in a virtual space indicated by the positional information. Thus, the server 10 according to the present exemplary embodiment can manage electronic data items in virtual space.

Figure 12:
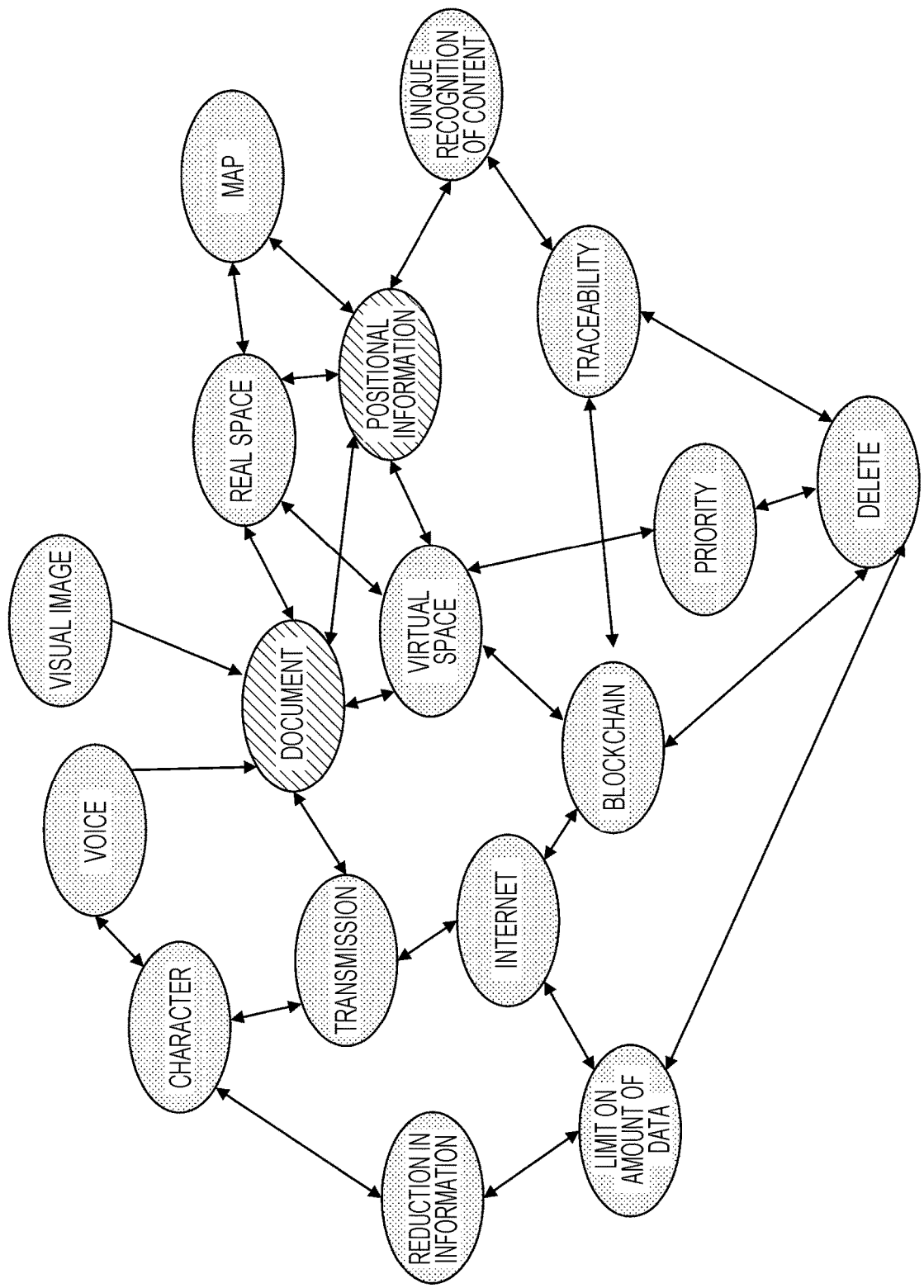
FIG. 12 is an illustration depicting an example of structured information according to the present exemplary embodiment.

FIG. 12 is an illustration depicting an example of structured information according to the present exemplary embodiment. In the structured information depicted in FIG. 12, each arrow direction represents a parent-child relationship of two pieces of information. In the structured information depicted in FIG. 12, "DOCUMENT" and "POSITIONAL INFORMATION" constitute the centerpiece of the structured information. Various kinds of information can be structured around "DOCUMENT" and "POSITIONAL INFORMATION". In the present exemplary embodiment, in particular, "REAL SPACE" and "VIRTUAL SPACE" are associated with "DOCUMENT" and "POSITIONAL INFORMATION" as structured information, and thus positional information that are associated with real space and virtual space can be attached to an electronic data item.

In the exemplary embodiment described above, the CPU loads software (a program) and executes the electronic data management process, but the electronic data management process may be executed by various processors other than the CPU. Examples of such a processor include a programmable logic device (PLD), such as a field-programmable gate array (FPGA), whose circuit configuration is modifiable after fabrication, and a dedicated electric circuit, such as an application-specific integrated circuit (ASIC), which is a processor having a circuit configuration exclusively designed to execute a specific process. Further, the electronic data management process may be performed by using one of the various processors described above or by using a combination of two or more similar or dissimilar processors (for example, a combination of a plurality of FPGAs or a combination of a CPU and an FPGA). More specifically, the hardware structure of these various processors is an electric circuit formed by a combination of circuit elements such as semiconductor devices.

Further, in the above exemplary embodiment, a situation in which the program for the electronic data management process is stored (installed) in the ROM or in the repository in advance has been described by way of non-limiting example. The program may be recorded on a non-transitory recording medium and provided. Examples of the non-transitory recording medium include a compact disc read-only memory (CD-ROM), a digital versatile disc read-only memory (DVD-ROM), and a universal serial bus (USB) memory. Alternatively, the program may be downloaded from an external apparatus via a network.

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a processor configured to:
        when an electronic document is created, attach positional information to the electronic document;
        present the electronic document, in a virtual space representing a real space, at a location indicated by the attached positional information;
        when the electronic document presented at the location is a plurality of items, change a presentation mode of the plurality of items depending on a count of the plurality of items to which the same positional information is attached;
        present a first image when the count of the plurality of items to which the same positional information is attached is determined to be less than a predetermined threshold; and
        present a second image when the count of the plurality of items to which the same positional information is attached is determined to be greater than or equal to the predetermined threshold.

2. The information processing apparatus according to claim 1,
    wherein the processor is configured to attach the positional information, as virtual positional information, to the electronic document based on an instruction to place the electronic document at a specified location in the virtual space, and
    wherein the attached virtual positional information indicates the specified location in the virtual space.

3. The information processing apparatus according to claim 2,
    wherein the processor is configured to, if a permission is required to place the electronic document at the specified location, report contact information of an administrator who manages the specified location.

4. The information processing apparatus according to claim 2,
wherein the processor is configured to attach the positional information to the electronic document upon a determination that the instruction has been given by a user authorized to place the electronic document at the specified location.

5. The information processing apparatus according to claim 4,
wherein the processor is configured to authorize the user to place the electronic document at the specified location upon a determination that the user has viewed an advertisement.

6. The information processing apparatus according to claim 2,
wherein the processor is configured to receive a setting of an authority required for viewing the electronic document, and
wherein the processor is configured not to present the electronic document in the virtual space to a user who does not have the required authority.

7. The information processing apparatus according to claim 2,
wherein the processor is configured to:
determine whether the instruction has been received within a predetermined time period in which placement of the electronic document at the specified location is allowed, and
attach the virtual positional information to the electronic document upon a determination that the instruction has been received within the predetermined time period.

8. The information processing apparatus according to claim 1,
wherein the processor is configured to present the electronic document in the virtual space by using augmented reality.

9. The information processing apparatus according to claim 8,
wherein the virtual space is a displayed visual image of the real space captured by a camera, and
wherein the processor is configured to present the electronic document on the visual image.

10. The information processing apparatus according to claim 9,
wherein the processor is configured to perform a process on the electronic document in accordance with an operation on the visual image.

11. The information processing apparatus according to claim 1,
wherein the virtual space is a displayed map of the real space, and
wherein the processor is configured to present the electronic document on the map.

12. The information processing apparatus according to claim 1,
wherein the processor is configured to present, in the virtual space, guiding information leading to the location indicated by the attached positional information.

13. The information processing apparatus according to claim 1,
wherein the processor is configured to change a presentation mode of the electronic document in accordance with an amount of time that has passed after placement of the electronic document.

14. The information processing apparatus according to claim 1,
wherein the processor is configured to:
receive an edit of the attached positional information, and
present the electronic document, in the virtual space, at a location indicated by the edited positional information.

15. The information processing apparatus according to claim 1,
wherein the processor is configured to remove the electronic document from the virtual space in response to the electronic document being stored on an apparatus other than the information processing apparatus.

16. The information processing apparatus according to claim 1,
wherein the electronic document is a computer program with which to operate a computer.

17. The information processing apparatus according to claim 1,
wherein the electronic document is created by a word processing application, a spreadsheet application, or a presentation application.

18. A non-transitory computer readable medium storing a program causing a computer to execute a process for information processing, the process comprising:
when an electronic document is created, attaching positional information to the electronic document; and
presenting the electronic document, in a virtual space representing a real space, at a location indicated by the attached positional information;
when the electronic document presented at the location is a plurality of items, changing a presentation mode of the plurality of items depending on a count of the plurality of items to which the same positional information is attached;
presenting a first image when the count of the plurality of items to which the same positional information is attached is determined to be less than a predetermined threshold; and
presenting a second image when the count of the plurality of items to which the same positional information is attached is determined to be greater than or equal to the predetermined threshold.

19. An information processing apparatus comprising:
means for attaching, when an electronic document is created, positional information to the electronic document;
means for presenting the electronic document, in a virtual space representing a real space, at a location indicated by the attached positional information;
when the electronic document presented at the location is a plurality of items, means for changing a presentation mode of the plurality of items depending on a count of the plurality of items to which the same positional information is attached;
means for presenting a first image when the count of the plurality of items to which the same positional information is attached is determined to be less than a predetermined threshold; and
means for presenting a second image when the count of the plurality of items to which the same positional information is attached is determined to be greater than or equal to the predetermined threshold.

* * * * *